United States Patent [19]
Olender et al.

[11] Patent Number: 5,834,632
[45] Date of Patent: Nov. 10, 1998

[54] PHOTO-ACOUSTIC LEAK DETECTOR WITH MULTIPLE BEAMS

[75] Inventors: Frederick T. Olender, Somers; Bernard A. Woody, Tolland; Leon A. Newman, Glastonbury, all of Conn.

[73] Assignee: United Technologies Corporation, Hartford, Conn.

[21] Appl. No.: 835,043

[22] Filed: Mar. 27, 1997

[51] Int. Cl.[6] ........................................................ G01M 3/16
[52] U.S. Cl. ........................... 73/40.7; 73/40.5 A; 73/41; 73/24.02
[58] Field of Search .................... 73/40.7, 40, 40.5 A, 73/46, 24.02, 24.06, 592, 41

[56] References Cited

U.S. PATENT DOCUMENTS

| | | | |
|---|---|---|---|
| 3,925,666 | 12/1975 | Allan et al. | 250/338 |
| 4,457,162 | 7/1984 | Rush et al. | 73/24 |
| 4,555,627 | 11/1985 | McRae, Jr. | 250/334 |
| 4,772,789 | 9/1988 | Maram et al. | 250/330 |
| 5,161,408 | 11/1992 | McRae et al. | 73/40.7 |

OTHER PUBLICATIONS

Photonics Spectra, Apr. 1994, "Laser Applications," *Assembly–Line Leak Testing*, p. 114.
Brassington, D. J., "Photo–acoustic detection and ranging—a new technique for the remote detection of gases." J. Phys. D: Appl. Phys., 15 (1982), pp. 219–228.
Allen, Jr., John E. et al., "Optoacoustic pulses in a flame." Optics Letters, vol. 1, No. 4, Oct. 1977, pp. 118–120.

*Primary Examiner*—Michael Brock
*Attorney, Agent, or Firm*—Gerald L. DePardo

[57] ABSTRACT

A photo-acoustic leak detection system for detecting a gas leaking from a component 30, includes at least two laser beams 24,26, incident on the component 30 and disposed so as to completely illuminate an inspection region 159 around at least a portion 28 of the component 30, each beam having a corresponding wavelength $\lambda_1$ which is absorbed by the gas, the gas emitting an acoustic signal 36 when the gas absorbs light from at least one of the beams, an acoustic sensor 40, which receives the acoustic signals 36 and provides a sensor signal indicative thereof on a line 42 to a bandpass filter 44 and a synchronous detector 18 which provide a filtered signal indicative of the acoustic signal 36 on a line 50 to a signal processor 52. The processor 52 provides an output signal indicative of the leak in the component 30.

52 Claims, 8 Drawing Sheets

PHOTO-ACOUSTIC LEAK DETECTOR WITH MULTIPLE BEAMS

CROSS REFERENCES TO RELATED APPLICATIONS

Copending U.S. patent application, Ser. No. 08/824,948, entitled "Photo-Acoustic Leak Detector With Improved Signal-to-Noise Response", filed contemporaneously herewith, contains subject matter related to that disclosed herein.

TECHNICAL FIELD

This invention relates to leak detection and more particularly to photo-acoustic leak detection.

BACKGROUND ART

Leak testing of various components (or systems) which are required to be gas-tight or liquid-tight, such as heat exchanger coils, fuel tanks, pressure vessels, fuel or hydraulic lines, etc., is a common step in the manufacturing process of such components. It is known in the art of leak testing to detect various structural flaws in components, such as leaky joints, cracks, porosity, and the like, by pressurizing the component with a gas and detecting trace quantities of the gas leaking from such components.

One way to detect such leaking gas is to use a known "photo-acoustic" effect. The photo-acoustic effect, as is known, occurs when gas absorbs light which is incident on the gas. When the wavelength of the incident light is absorbed by the gas, the absorbed optical energy heats the gas. As the heated gas expands, it produces pressure or acoustic waves, i.e., sound, which propagates from the point of heating. If the energy absorbed is of sufficient magnitude, the acoustic waves may be detected by an acoustic sensor, such as a microphone, which provides an electrical signal indicative of the acoustic waves. The electrical signal amplitude is related to tracer gas concentration, the laser pulse energy, tracer gas absorption intensity, and the interrogation volume, as is known. It is also known to use such photo-acoustic effect for detecting the location of leaks in the component or system under test.

One prior art photo-acoustic leak detection system uses a pulsed or scanned laser beam incident on the component under test and the component is pressurized with a gas which strongly absorbs the laser light. If a leak exists and the light is incident on the emerging gas, the gas absorbs the light and produces the aforementioned acoustic emission which is detected by a microphone or similar acoustic sensor. The electrical signal from the microphone is then used to notify the operator that a leak is present. Such a system is described in U.S. Pat. No. 5,161,408, entitled "Photo-Acoustic Leak Detection System and Method", to McRae et al.

Another prior art system which uses photo-acoustic detection is the system described in D. J. Brassington, "Photo-acoustic Detection and Ranging—a New Technique for the Remote Detection of Gases", Journal of Physics D: Applied Physics, 15(1982), pages 219–228, which uses a pulsed laser to determine the presence and distance (or range) to a gas source or leak.

However, existing systems do not provide 100% leak detection coverage (ie., complete illumination) of the component (or portion thereof) being inspected in a time-efficient manner or with minimal complexity and/or cost. Also, current systems do not provide complete illumination on a single pass of the component through the leak detection system.

DISCLOSURE OF INVENTION

Objects of the invention include provision of a photo-acoustic leak detection system which provides 100% leak detection coverage (complete illumination) of the component (or a portion thereof) being inspected in a time-efficient manner.

According to the present invention a photo-acoustic leak detection system for detecting a gas leaking from a component, comprises at least two laser beams, incident on the component and disposed so as to completely illuminate an inspection region around at least a portion of the component, each beam having a corresponding wavelength which is absorbed by the gas, the gas emitting an acoustic signal when the gas absorbs light from at least one of the beams; at least one acoustic sensor, which receives the acoustic signal and provides a sensor signal indicative of the acoustic signal; and a signal processor, which receives the sensor signal and provides an output signal indicative of the leak in the component.

According further to the present invention, the laser beams each are pulsed at a corresponding pulse frequency. According further to the present invention, the beams are stationary or moved across at least a portion of the component.

According still further to the present invention, the complete illumination of the inspection region occurs on a single exposure of the component by the beams.

The present invention represents a significant improvement over the prior art by providing a leak detection system that has two (or more) beams incident on the component. The invention provides 100% leak detection coverage (i.e., complete illumination) of the inspection region around at least a portion of the component, such as one or more joints, by the leak detection system, thereby reducing the time required to interrogate the inspection region over prior art systems. Also, the invention allows for complete illumination to be achieved on a single exposure of the component by the beams. The invention allows for both leak detection and isolation of the leak location on the component. Also, the invention allows for various sizes and shapes of the beams to be used depending on the size and shape of the component and the leak location isolation requirements, and the beams may be stationary with the component moved through the beams and/or the beams scanned or moved across the component.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
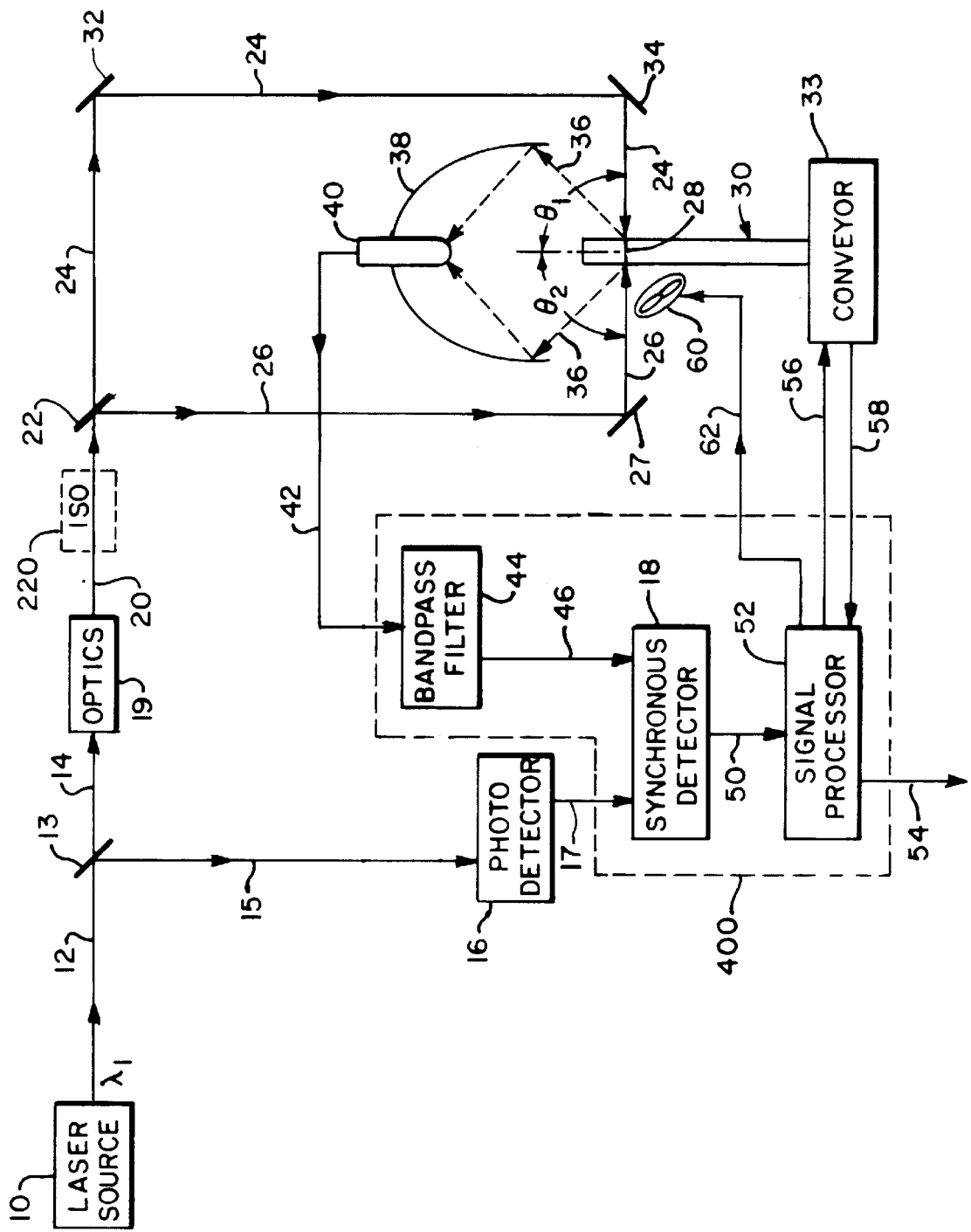
FIG. 1 is a schematic block diagram of a photo-acoustic leak detection system in accordance with the present invention.

Referring to FIG. 1, a photo-acoustic leak detection system comprises a high pulse repetition frequency (PRF) laser 10, e.g., an LC40 Passively Q-Switched $CO_2$ infra-red laser made by DeMaria Electro-Optic Systems, which provides a laser light beam 12 which is pulsed at a pulse repetition frequency (PRF) or pulse frequency, and has a wavelength $\lambda_1$. Any other laser pulsing techniques may be used if desired, e.g., a CW laser with a chopper. Also, any other laser or optical source which provides pulsed laser beams having the characteristics described herein may be used if desired. The beam 12 is linearly polarized; however, unpolarized or other polarized light (e.g., circularly, elliptical, etc.) may also be used. The beam 12 is incident on a 95/5 beam splitter 13 which passes 95% of the beam 12 as a passed beam 14 and reflects 5% of the beam 12 as a reflected reference beam 15. Other percentage ratio beam splitters may be used to provide the reference beam 15. The reference beam 15 is incident on a photodetector 16 which provides an electrical reference signal on a line 17 indicative of the reference beam 15. The electrical reference signal is fed to a synchronous detector 18 (or demodulator), discussed hereinafter.

The passed beam 14 is incident on known beam-forming optics 19, e.g., a telescope, which receives the beam 14 and provides an output beam 20 having the desired divergence and diameter for the intended application (discussed hereinafter). The beam 20 is incident on a 50/50 beam splitter 22 which provides a passed beam 24 and a reflected beam 26, each having equal energy. The reflected beam 26 is incident on a mirror 27 which reflects the beam 26 onto a joint (or seam) 28 of a component 30 under test, e.g., cylindrical compressor coils (discussed more hereinafter). The component 30 may comprise many of the joints 28 where leaks may occur. Other components or systems may be leak tested if desired, such as fuel tanks, pressure vessels, fuel or hydraulic lines or housings, electrical switch housings, engine transmission cases, brake cylinders, or other components or systems which must be gas-tight or liquid-tight to within certain tolerances or from which it is desirable to detect the leakage of gases.

The passed beam 24 is incident on a mirror 32 which reflects the beam 24 to another mirror 34. The mirror 34 reflects the beam 24 onto the opposite side of the joint 28 from the beam 26. The component 30 is moved along through the two stationary beams 24,26 by a conveyer 33 in a direction normal to the page in FIG. 1 at a predetermined rate, e.g., 2 a inches/second (5.08 cm/sec). Other conveyor rates may be used if desired. Instead of some or all of the beam splitters and mirrors in FIG. 1, other optical components and arrangements may be used if desired to provide the beams 24,26 incident on the joint 28. Also, more than one laser source may be used to provide the beams 24,26, e.g., two laser sources each providing one of the beams 24,26 incident directly on the component with or without using directional mirrors and/or beam splitters.

If there is any gas within the component 30 which leaks from the joint 28, acoustic waves 36 will propagate from the point at which the leaking gas (not shown) is illuminated by one or both of the pulsed beams 24,26, due to the photo-acoustic effect discussed hereinbefore in the Background Art section hereof. The frequency of the acoustic wave signals 36 is the same as that of the pulse repetition frequency (PRF) of the pulsed laser beams 24,26.

The acoustic waves 36 are incident on an ellipsoidal (or elliptic) reflector 38 which reflects the acoustic waves 36 onto a microphone 40. The acoustic waves 36 may also be directly incident on the microphone 40. The microphone 40 provides an electrical signal indicative of the acoustic waves 36 on a line 42. The microphone 40 is a Model 2520, made by Larson Davis Laboratories, having a diameter of about 0.25 inches (6.35 mm), a bandwidth of 100 KHz (within +/−2 dB) and a dynamic range of 164 dB (when the output contains 3% harmonic distortion). Any other microphone, diameter, bandwidth and/or dynamic range may be used if desired, provided it is capable of detecting the signal levels and frequencies expected for detection of the acoustic leak signal. Also, the bandwidth of the acoustic sensor 40 includes the PRF of the laser beam 12.

The ellipsoidal reflector 38 around the microphone 40 allows for peak acoustic sensitivity at both foci of the ellipse, as is known. One focus is at the leak location (the source of the acoustic waves), i.e., the joint 28, and the other focus is at the acoustic sensor membrane of the microphone 40. By peaking the acoustic response at specific locations, the reflector 38 reduces the effect of acoustic sensitivity to background acoustic noise from other sources unrelated to the leak location (discussed hereinafter). The diameter of the ellipsoidal reflector 38 for the microphone 40 is approximately 6 inches (15.24 cm) and the distance from the microphone to the joint 28 is approximately 1 foot (30.48 cm). Other distances, positioning, and diameters of the reflector 38 may be used, if desired. Also, instead of elliptical, the shape of the reflector 38 may be parabolic or hyperbolic, or other shapes if desired. Further, the reflector 38 may be omitted if desired; however, decreased signal-to-noise ratio may result. Also, instead of a microphone, any other acoustic sensor which can detect the photo-acoustic signals 36 may be used. Also, the signal provided to the filter 44 need not be electrical but may be optical, e.g., with an optical acoustic sensor, or another type of signal.

The line 42 is fed to a known bandpass filter 44 having a frequency response which passes frequencies in the passband and attenuates or blocks frequencies outside the passband, and provides a filtered output signal on the line 46 indicative thereof. The passband of the filter 44 is 7.6 KHz, with a range from 71.2 KHz to 78.8 KHz (3 dB points). The filter 44 comprises a low pass filter and a high pass filter connected in series to produce a bandpass frequency response. The transfer functions for each of the low pass and high pass filters is a Cauer-elliptic filter having 8 poles (roots of the denominator polynomial) and 6 zeros (roots of the numerator polynomial), Model Nos. 858L8EY and 858H8EY, respectively, made by Frequency Devices, of Haverhill, Mass. The resulting frequency response has a steep roll-off outside the passband and a time step response overshoot of approximately 20%. The passband of the filter 44 includes the pulse frequency of the laser 12 (which is also the acoustic frequency of the signal 36). Other passbands, rolloffs, and overshoots may also be used.

The bandpass filter 44 reduces the effects of unwanted background noise frequencies outside the filter passband. The frequency response of the bandpass filter 44 is selected to suit the noise environment that the detection system must support and to maximize the acoustic and electronic signal-to-noise ratio. Instead of a bandpass filter, other filter types may be used if desired, e.g., high pass filters or low pass filters, etc.

The filtered electrical signal on the line 46 is fed to the synchronous detector 18. The synchronous detector 18 comprises a known "lock-in" amplifier which has sufficient sensitivity and bandwidth to detect the signal level and bandwidth of the microphone signal on the line 42. The reference (or sync) frequency of the detector 18 is the pulse repetition frequency (PRF) of the laser beam 12 provided on the line 17. The synchronous detector 18 samples the filtered signal on the line 46 synchronously with the PRF of the laser beam 12, thereby rejecting noise outside the PRF. The synchronous detector 18 provides an electrical signal on a line 50 indicative of the acoustic energy at the laser PRF. The details of the synchronous detector 18 (and/or lock-in amplifier) and alternatives thereto, as well as various signal waveforms, may be as described in FIGS. 4–7 and the associated text of Copending U.S. patent application, Ser. No. 08/824,948, entitled "Photo-Acoustic Leak Detector With Improved Signal-to-Noise Response", filed contemporaneously herewith. Instead of the synchronous detector 18, other narrow frequency band filters may be used if desired (which may also replace the filter 44), as described in the aforementioned Patent Application. Also, any other types of detection or demodulation may be used if desired, e.g., synchronous or asynchronous, phase-sensitive or not phase-sensitive. Any other type of filtering or detection may be used to detect the energy at the pulse frequency.

The line 50 is fed to a signal processor 52 which determines whether or not a leak exists and/or location and/or amount of the gas leak, and provides an electrical signal on a line 54 indicative thereof. The signal processor 52 comprises known electronic analog and/or digital components and the necessary signal processing, memory, and/or interface capabilities sufficient to perform the functions described herein. Also, the signal processor 52 may comprise a programmed digital computer. The signal processor 52 samples the signal on the line 50 at a predetermined rate, e.g., 50 samples/second (50 Hz). Other sample rates or continuous time analog circuits may be used. Also, the signal processor 52 may provide filtering of electrical noise spikes as described in the aforementioned Patent Application.

The signal processor 52 receives a position signal on a line 58 from the conveyor 33 indicative of the location of the component 30 and may also provide a position control signal on lines 56 which controls the position of the component 30. Any other technique for determining where the beams 24,26 are incident on the component 30 may be used if desired.

The wavelength $\lambda_1$ of the pulsed laser beam 12 (and thus the beams 24,26) is selected to be a wavelength that is absorbed by the gas leaking from the joint 28. For a tracer gas of sulfur hexafluoride ($SF_6$), the wavelength $\lambda_1$ of the laser light for optimal absorption by the gas is 10.55 microns in the infra-red range. Other wavelengths within the $SF_6$ wavelength absorption range may be used if desired. Also, the two beams 24,26 may have different wavelengths, provided the wavelengths of both beams 24,26 are absorbed by the gas. Also, each of the beams 24,26 may comprise more than one wavelength which is absorbed by the gas. Further, other gases may be used if desired. In that case, the beam wavelength(s) would be set to an absorption wavelength of the gas used.

In addition to the photo-acoustic signal 36 generated by the gas leak, acoustic signals are also produced from other sources, e.g., air compressors, noisy machinery, etc., known as background acoustic noise. Such acoustic noise may be so large as to be indistinguishable from acoustic signals generated by a gas leak.

As discussed in the aforementioned copending Patent Application, if the PRF (or pulse frequency) of the laser beam 12 (and, thus, the beams 24,26) is set at a frequency where the background acoustic noise is at or below a predetermined acceptably low level, based on the desired signal-to-noise ratio, the amount of background noise passed by the bandpass filter 44 and detected by the synchronous detector 18 is minimized. This occurs because the frequency of the acoustic signal 36 is substantially the same as the pulse repetition frequency (PRF) of the laser beam 12, as discussed hereinbefore. Any desired signal-to-noise ratio (greater than 1-to-1, to allow the signal to be distinguishable from the noise, as is known) may be used, depending on the application and the noise margin desired. For example, an acceptable low noise level is a three-to-one ratio below the acoustic leak signal associated with the desired minimum leak sensitivity. Other larger or smaller ratios may be used if desired depending on the desired noise margin.

The PRF for the laser beam 12 (and thus the beams 24,26) may be chosen by analyzing the acoustic frequency spectrum of the environment where the system will be used (e.g., a factory area), and determining the lowest background noise frequencies, which will correspond to the best PRF's for the laser. We have found that a PRF of 75 KHz produces acceptable noise immunity because the background acoustic noise in many factories is at acceptably low levels at this frequency. However, other PRFs may be used if desired, e.g., 10 Khz to 200 Khz, or any other frequencies as well. The maximum pulse frequency is a function of, inter alia, the bandwidth of the laser pulsing technique used, the high frequency response characteristics of the microphone, filters and other system components, and the relaxation time of the gas (discussed hereinbefore). The minimum pulse frequency is a function of, inter alia, the desired speed at which the component is to be inspected, the number of exposures per inspection, and the speed at which the component moves through the beams and/or the beams move across the component.

Also, the beams 24,26 may each have a different pulse frequency if desired (discussed more hereinafter). Such techniques for reducing background noise may be used with any number of beams, i.e., one or more beams.

Also, as discussed in the aforementioned copending Patent Application, the leak detection system may also provide signal-to-noise measurement and alert the operator that the background acoustic noise at the pulse frequency is above an acceptable level. Alternatively, as discussed in the aforementioned copending Patent Application, the system may adjust the signal-to-noise response by measuring the background acoustic noise frequency over a predetermined frequency range (spectrum) and selecting the laser pulse frequency which provides the desired signal-to-noise response. Such measurement and/or adjustment may be performed periodically, continuously, or on request.

At the locations where the beams 24,26 are incident on the joint 28, the beams 24,26 have a diameter of approximately ⅜" (9.525 mm), approximately equal to the diameter of the joint 28, they are slightly divergent beams and they have an average power of approximately 0.25–0.3 watts per beam. The greater the optical power, the greater the acoustic return signal will be for a given leak. The beams 24,26 have a standard Gaussian power distribution across the beam diameter with 98% of the power radiating in the $TEM_{00}$ mode. The pulsed laser beams 24,26 each comprise a series of short-duration pulses approximately 150 nanoseconds full-width-half-max (FWHM) in duration, every 13.33 microseconds, corresponding to a PRF of 75 Khz. For an average power of 0.25 to 0.3 Watts per beam, the energy per pulse for each beam is approximately 3.33 to 4 micro-joules (Average Power/PRF). We have found that the aforementioned beam characteristics generate sufficient acoustic levels to enable reliable leak detection of approximately 0.1 oz/year (or less) of the tracer gas $SF_6$.

Other leak levels may be sensed if desired, depending on the beam characteristics used. Also, other beam diameters, powers, power distribution profiles, and divergence may be used if desired depending on the application, required sensitivity, component size, safety considerations, etc. For example, instead of a Gaussian power distribution, a "top-hat" or square distribution profile may be used Also, optical apertures or other optical components may be used if desired to tailor the power profile of the beams 24,26 incident on the joint 28.

The beam diameter is determined by the size of the joint 28, the desired cross-sectional power distribution of the beam, the amount of vertical movement of the joint 28 (alignment tolerance), and the side view angles of incidence $\theta_1, \theta_2$ of the beams 24,26, respectively, from vertical to the joint 28 (shown as 90° in FIG. 1). The beam diameter need not be the same as the diameter of the joint 28, but may be smaller or larger than the joint 28 if desired. Instead of the beams 24,26 being divergent beams, collimated or focused beams may be used instead; however, a diverging beam provides maximum safety for operating personnel.

Other PRFs (or pulse frequencies) and pulse widths than those discussed herein for the beams 24,26 may be used if desired. Also, the pulse shape may have any rise and/or fall shapes, if desired, e.g., Gaussian, rectangular, triangular, exponential, rounded, etc., and the rise and fall shapes need not be symmetric. It suffices for the present invention that the beams provide complete illumination of an inspection region around at least a portion of the component, as discussed herein. Further, as discussed in the aforementioned Patent Application, the relationship between the optical pulse frequency and the desired detection frequency of the photo-acoustic signal need not be one-to-one. In the event the pulse frequency is not the same as the desired detection frequency of the photo-acoustic signal, the response of the filter 44 (FIG. 1) and the synchronous detector 18, and the frequency of the reference signal on the line 17, would be set to the desired detection frequency of the photo-acoustic signal, and the optical pulse frequency would be set based on the magnitude of the background noise at the desired detection frequency.

Also, pulsing of the beams 24,26 is not required for the present invention. For example, the invention will also work with repetitive scanning of a continuous wave (CW) laser across the component, such as that discussed in the aforementioned U.S. Pat. No. 5,161,408, to McRae. Such repetitive scanning across the component (or portion thereof), provides a similar effect to pulsing the beam at the scan repetition frequency. However, in that case, the maximum frequency is limited to the maximum scan rate of the beam scanner.

Also, we have found that the time length of the optical pulses may be short compared to the overall period (i.e., a low percent duty cycle), since the heating of the target gas is substantially instantaneous and the resulting acoustic pressure pulse from the gas occurs on the rising edge of the energy pulse. An acoustic pressure pulse also occurs on the falling edge of the optical energy pulse. The time width (or time constant or relaxation time) of the pressure pulse generated from the gas (on either edge of the optical energy pulse) is approximately 1 microsecond based on the molecular relaxation of the absorbing gas. Other pressure pulse widths may exist depending on known photo-acoustic factors. Accordingly, if the laser pulse time of the beams 24,26 is increased to equal the width of the pressure pulse generated, this results in increasing the energy of the laser pulse, thereby proportionately increasing the average output power of the laser and reducing the safety of the system, without a corresponding increase in the acoustic signal improvement in leak detection. Therefore, we have found that a short duration optical pulse which deposits energy into the gas faster than the energy release time constant of the gas is more efficient and safe than a long duration optical pulse. However, longer duration optical pulses may be used if desired.

Figure 2:
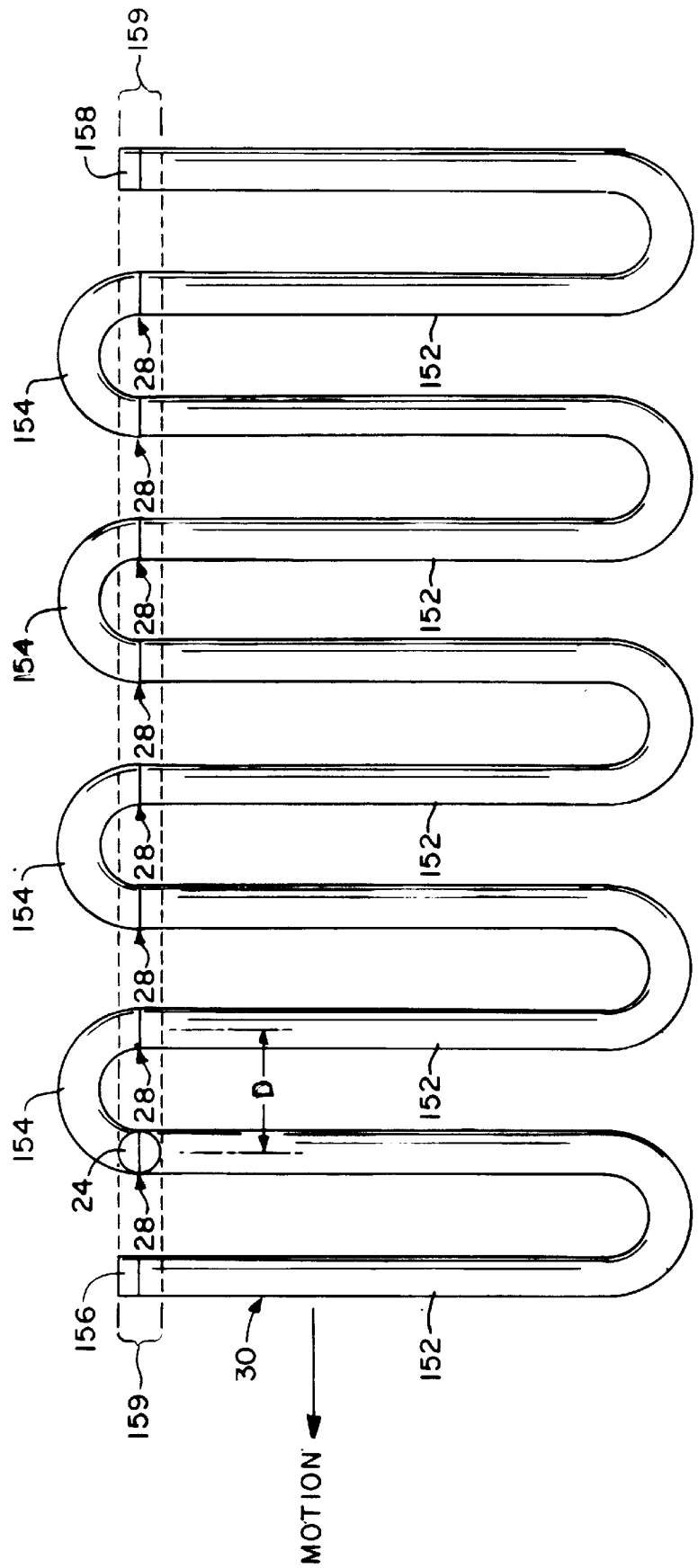
FIG. 2 is a side view of a heat exchanger coil and a beam incident thereon, in accordance with the present invention.

Referring now to FIG. 2, a right side view of the component 30 (FIG. 1) for a single row gas containment coil, e.g., tubing for a heat exchanger coil with the beam 24 incident thereon, is shown (the beam 26 would be on the opposite side). The coil 30 comprises a series of U-shaped tubes 152 (or "hair-pins") which are single-piece copper tubing. These U-shaped tubes 152 are connected together by curved copper tubing 154 (or "return bends") which meet the tubes 152 at the joints 28. The U-shaped tubes 152 have a length of 24 to 100 inches, a diameter of approximately ⅜"

(9.525 mm), and a wall thickness of approximately 0.017" (0.4318 mm). The distance D between the U-shaped tubes 152 is approximately 1" (2.54 cm) on center. Other lengths, thicknesses, diameters, distances (D), and materials may be used if desired. Also, there are end caps 156,158 at each end of the coil 30 to retain the gas pressure. Other known techniques may be used to retain the gas pressure. Also, any known plumbing connections may be used to pressurize the tube 30, such as releasable nozzle connections, etc. The beams 24,26 completely illuminate an inspection region 159 around the entire cross-sectional perimeter of each of the joints 28, thereby providing complete illumination of the joints 28 on a single pass through the beams 24,26.

Figure 3:
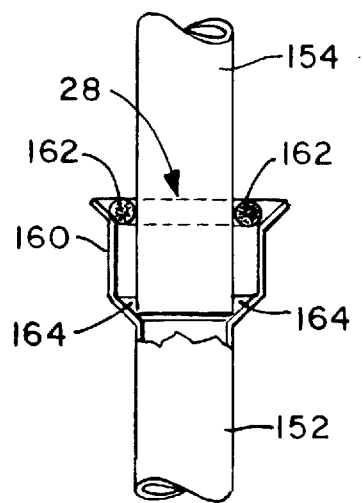
FIG. 3 is a blown-up side view of a joint of the coil of FIG. 2, in accordance with the present invention.

Referring now to FIG. 3, a blown-up drawing of one of the joints 28 inspected using the present invention shows a top region of the hair-pin tubes 152 having a flare 160 within which the return bend tube 154 is inserted. Brazing material 162 is placed between the tube 154 and the flange 160. Once brazed, the braze material 162 flows down and seals the regions 164 so as to provide an air (or liquid) tight seal between the return bend 154 and the tubes 152. Instead of brazing the joints 28 together, other bonding materials and techniques may be used if desired.

Figure 4:
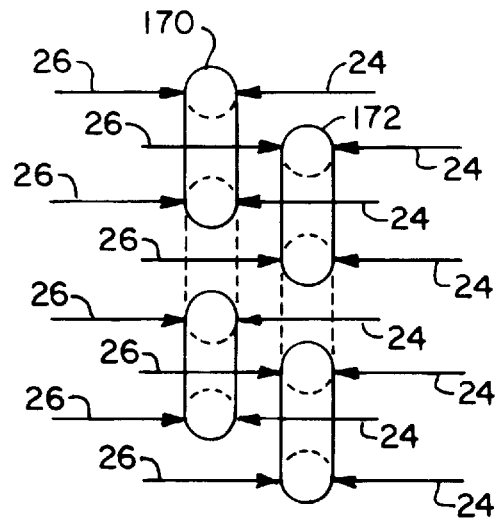
FIG. 4 is a top view of a two-row heat exchanger coil inspected in accordance with the present invention.

Referring now to FIG. 4, a top view of a dual-coil system has a first row of coils 170 offset from a second row of coils 172 such that the laser beams 26,24 (FIG. 1) can sequentially and completely illuminate each of the joints 28 for the two rows of coils 170,172.

Figure 5:
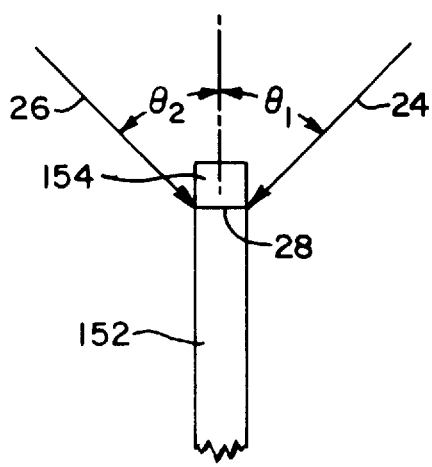
FIG. 5 is a side view of a tube joint showing the side angles of incidence of two laser beams incident on a joint, in accordance with the present invention.

Referring to FIG. 5, the side view angles of incidence $\theta_1, \theta_2$ from the vertical, of the two beams 24,26, respectively, need not be 90°. Instead, the angles $\theta_1, \theta_2$ may be at any other angle; however, if more than one row of coils is to be tested (such as in FIG. 4), the angle should be set to illuminate all rows by both beams.

Figure 6:
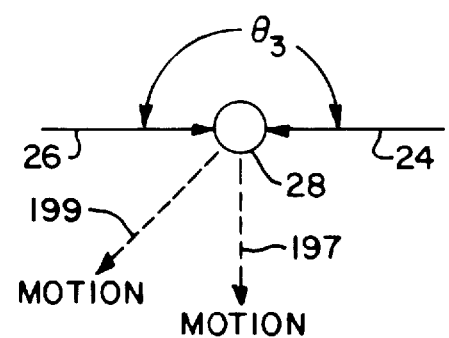
FIG. 6 is a top view of the tube joint of FIG. 5 showing the top angle of incidence of the two laser beams of FIG. 5, in accordance with the present invention.

Referring to FIG. 6, the two beams 24,26 are positioned on opposite sides of the joint 28 being inspected, having an angle $\theta_3$ of 180° between the beams 24,26, as seen from a top view of the ring-shaped joint 28 for the gas containment coil 30. Other top view angles $\theta_3$ between the beams 24,26 may be used if desired (discussed more hereinafter). Accordingly, with the two beams 24,26 incident on opposite sides of the joint 28, both sides of the joint 28 are inspected during a single pass through the beams 24,26, thereby providing 100% interrogation (complete illumination) of the joint 28 on a single pass of the joints 28 through the beams 24,26.

Referring to FIG. 1, in addition to photo-acoustic signals 36 generated by a gas leak, photo-acoustic signals (noise) may also be generated by the laser beams 24,26 striking various absorptive surfaces, contaminants or materials (either directly or due to reflections) in or on the component 30 or the leak detection system (e.g., a microphone) which may respond to the optical energy from the beams 24,26. As such, a baseline (or calibration or signature) non-leak photo-acoustic response of the component under test may need to be determined. Such a calibration also provides a baseline measurement for background acoustic noise from other acoustic sources (discussed hereinbefore).

To provide such a baseline condition for the detection of acoustic noise in the absence of a leak, a controlled airflow dilution source, such as a fan 60, may be used which receives a control signal on a line 62 from the signal processor 52. In that case, the signal processor 52 provides the control signal on the line 62 which turns on the fan 60. The airflow from the fan 60 displaces (or dilutes) gas leaking from the component 30, and eliminates (or greatly reduces) the acoustic effect from any gas leak which may exist, thereby providing a baseline non-leak acoustic signal which is measured by the signal processor 52 from the signal on the line 50. Then, the fan 60 is turned off, and the component 30 is passed through the laser beams 24,26 again and the acoustic signal is measured by the signal processor 52. The two signals, with and without the fan 60 on, are compared by the signal processor 52, to determine whether a leak exists.

Alternatively, a similar technique can be used where two measurements are taken for each joint 28 in the component 30 before interrogating the next joint. In that case, first a joint under interrogation is exposed to the beams 24,26 while the fan 60 is on and an acoustic signal is measured by the signal processor 52 from the signal on the line 50. Then, the fan 60 is turned off and the acoustic signal is measured for that joint. The two signals, with and without the fan 60 on, are compared by the signal processor 52, to determine whether a leak exists. The order in which the measurements are taken can be reversed if desired, i.e., the fan-off measurement may be taken first followed by the fan-on measurement.

In either case, using either of the above techniques, the arithmetic difference between the acoustic signal measurements for a given beam-exposed joint before airflow and during airflow performed by the signal processor 52 is the measure of the leak. If the difference is zero (when the accuracy and repeatability of the system are accounted for), then a leak does not exist. If the difference is non-zero (when the accuracy and repeatability of the system are accounted for), then a leak exists having a magnitude proportional to the resulting difference. It may not be necessary to calculate the precise amount of the leak but only determine that a leak above a certain predetermined threshold exists. Alternatively, instead of using a controlled airflow source, a sample calibration component 30 that does not have any leaks, or is not pressurized, may be moved through the system first, and a baseline reading taken to calibrate the system. This calibration may be sufficient for a predetermined number of pressurized samples and/or for a predetermined time period of measuring pressurized samples before the sample component is again passed through the system to re-calibrate the system.

Also, to improve detection of the location of large gas leaks, e.g., 3.0 oz/yr, the fan 60 may be run continuously at a rate which is high enough to prevent the build-up of leaking gas around numerous joints 28 (which would preclude the accurate detection of leak location), but a rate low enough to allow the desired small leaks to be detected.

Figure 18:
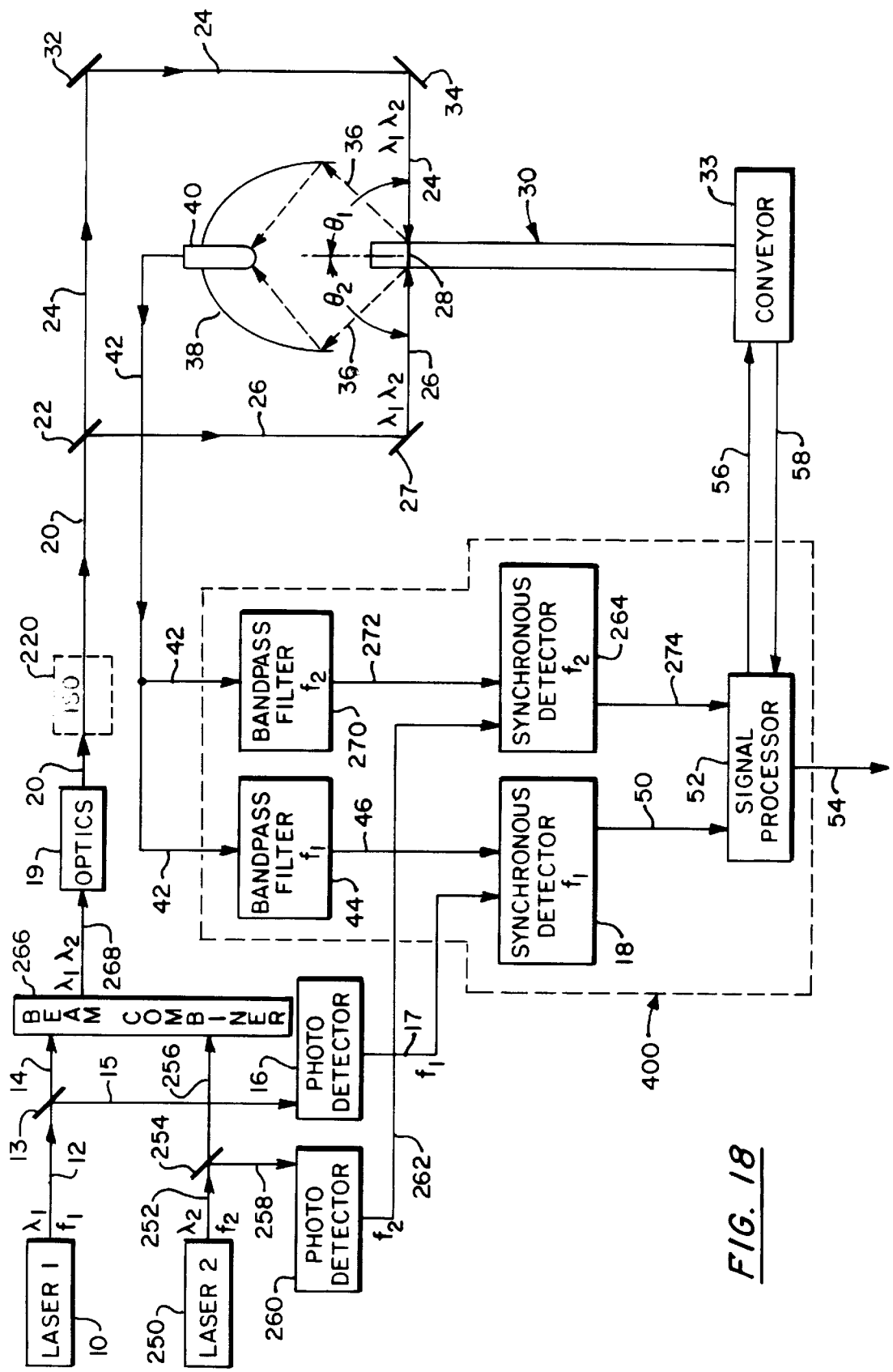
FIG. 18 is a schematic block diagram of an alternative embodiment of a photo-acoustic leak detection system having beams with more than one wavelength, in accordance with the present invention.

Referring to FIG. 18, alternatively, the laser beams 24,26 may each comprise a wavelength ($\lambda_1$) which is absorbed by the gas, and another wavelength ($\lambda_2$) which is not absorbed by the gas. In that case, the component 30 (or portion thereof) is pulsed with the non-absorbed wavelength $\lambda_2$ to obtain a non-leak baseline measurement, and it is also pulsed with the absorbed wavelength $\lambda_1$, either sequentially or simultaneously. The difference between the acoustic signals associated with the two wavelengths is indicative of the leak adjusted for non-leak effects.

In particular, FIG. 18 is similar to FIG. 1 with some added components. In particular, in FIG. 18, a second laser 250 provides a beam 252 at the non-absorbed wavelength $\lambda_2$ having a pulse frequency f2, which is different from the pulse frequency f1 of the beam 12 from the laser 10. The beam 252 is incident on a 95/5 beamsplitter 254 (similar to the beamsplitter 13 discussed hereinbefore with FIG. 1)

which provides a passed beam 256 and a reflected beam 258. The reflected beam 258 is incident on a photodetector 260 which provides an electrical signal on a line 262 to an additional synchronous detector 264, similar to the detector 18 but having a different reference frequency f2. The passed beam 256 and the passed beam 14 are incident on a beam combiner 266, e.g., a grating, which provides a beam 268 comprising both wavelengths $\lambda_1,\lambda_2$ and both pulse frequencies f1,f2. The combined beam 268 is incident on the beam forming optics 19 which provides the beam 20 having the desired characteristics as discussed hereinbefore.

Also, the line 42 is fed to an additional bandpass filter 270 having a passband which includes the pulse frequency f2. The filter 270 provides a filtered signal on a line 272 to the detector 264. The detector 264 provides a detected signal on a line 274 to the signal processor 52 indicative of the acoustic signal corresponding to the pulse frequency f2 and the non-absorbing wavelength $\lambda_2$. Thus, the signal on the line 274 is a non-leak baseline reading of the component 30. The signal processor 52 calculates the amount of the leak by subtracting the non-leak calibration measurement on the line 274 from the leak measurement on the line 50, and provides the leak signal on the line 54.

Any other techniques and configurations for providing the beams 24,26 with the two wavelengths $\lambda_1,\lambda_2$ and the measurement of the leak and non-leak signals may be used if desired. Also, each of the beams 24,26 may comprise more than one non-absorbing wavelength.

Figure 7:
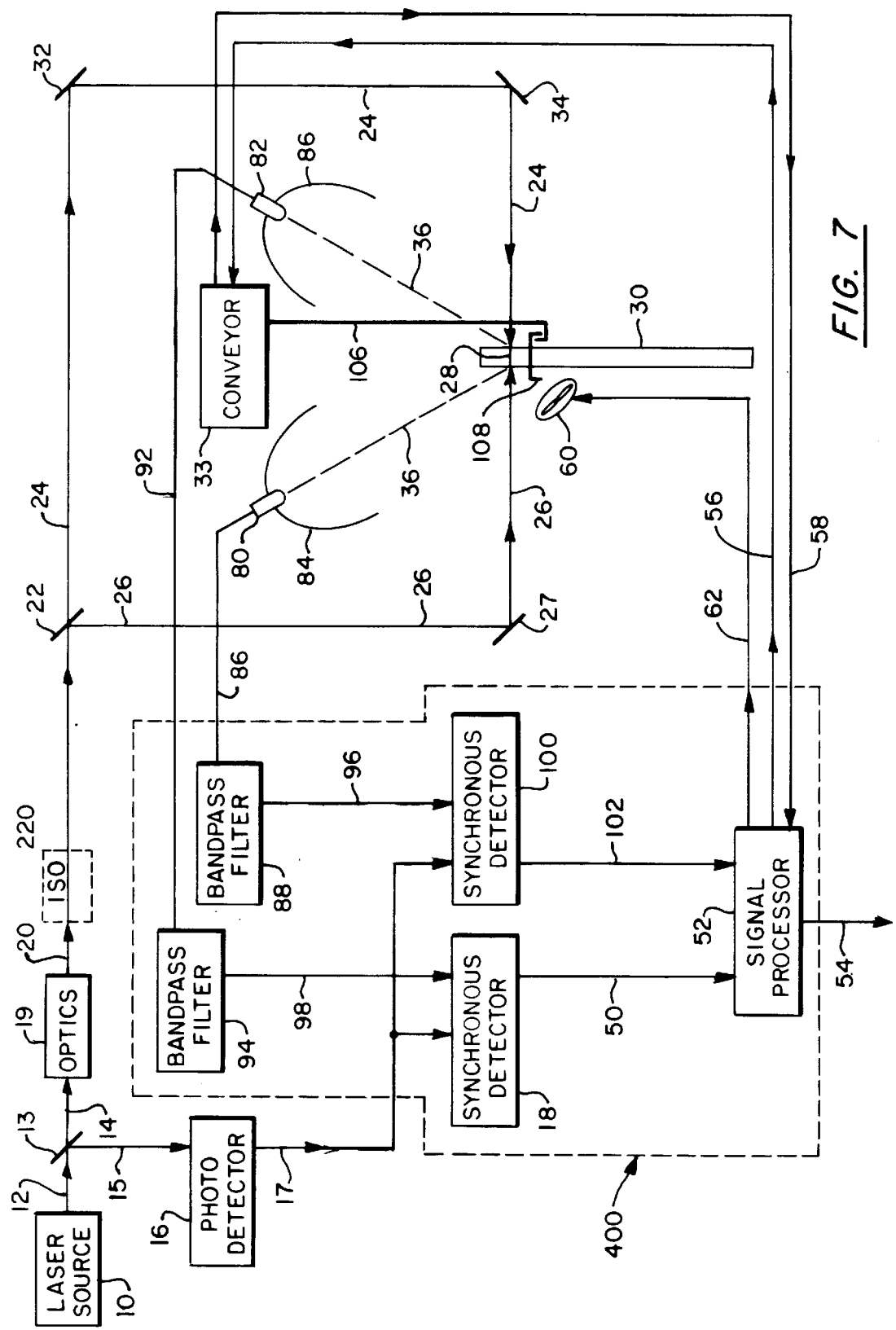
FIG. 7 is a schematic block diagram of an alternative embodiment of a photo-acoustic leak detection system having a plurality of acoustic sensors, in accordance with the present invention.

Referring now to FIG. 7, instead of having a single microphone 40 (FIG. 1) detect the acoustic leak signals 36, two microphones 80,82 having optional elliptical reflectors 84,86, respectively, may be used. More than two microphones may be used, if desired. The microphones 80,82 are spaced approximately equidistant from the joint 28 under inspection, e.g., 1 foot (30.48 cm). However, other distances and unequal distances may be used if desired. The microphone 80 provides an electrical signal on a line 86 to a bandpass filter 88, similar to the bandpass filter 44 discussed hereinbefore in FIG. 1. Similarly, the microphone 82 provides an electrical signal on a line 92 to a bandpass filter 94, similar to the bandpass filter 88. The bandpass filters 88,94 provide electrical signals on lines 96,98, respectively, indicative of the energy in the passband of the filters 88,94.

The filtered signal on the line 98 is fed to the synchronous detector 18 as in FIG. 1. The filtered signal on the lines 96 is fed to a second synchronous detector 100 which also receives the reference signal on the line 17. The detector 100 is similar to the detector 18, and provides a signal on a line 102 to the signal processor 52 (similar to the signal on the line 50). Thus, the signal processor 52 receives two detection signals on the lines 50,102, respectively, each indicative of the acoustic leak signal detected by a corresponding one of the microphones 82,80, respectively. The signal processor 52 may either sample the signals on the lines 50,102 individually or combine them together, to determine whether or not a leak exists. Instead of the separate synchronous detectors 18,100 a single multiple-input-channel synchronous detector with a common reference frequency may be used if desired.

The two filters 94,88 and the two synchronous detectors 18,100 are provided because phase shifts may exist between the acoustic signals 36 received from the two microphones 82,80, respectively, for the same leak. Such separate filters and synchronous detectors are used to prevent signal amplitude or frequency distortion which may occur if phase shifted signals from the microphones 80,82 are combined and fed to a single filter. Alternatively, to reduce hardware, the signals on the lines 86,92 from the microphones 80,82, respectively, may be combined and fed to a single bandpass filter and/or synchronous detector, provided such distortions are accommodated for in the design, as is known by those skilled in the art of acoustics and filter design. If more than two microphones are used, an additional bandpass filter and synchronous detector may be used for each additional microphone, or some of the filters and synchronous detectors may be combined to reduce hardware as discussed hereinbefore.

This multiple microphone technique is particularly useful in the event that the conveyor machinery 33 is located above the component 30 which may have a conveyor arm 106 which is connected to (or hooked under) a plate 108 (or "tube sheet") connected to the component 30 and which moves the component 30 through the beams 24,26. The arm 106 may be transparent to the beam 24 or may have an open space where the joints 28 are located to allow the beam 24 to illuminate the joints 28. Also, using two microphones may allow the leak to be isolated to one side of the component 30. This may occur if one microphone receives a stronger acoustic signal from a leak on the side of the component 30 where that microphone is located than the other microphone (on the other side of the component 30) receives for the same leak.

Such a multiple microphone system will also work with a system using two (or more) wavelengths and/or two (or more) pulsing frequencies, such as that discussed hereinbefore with FIG. 18. In that case, each of the microphones may be connected to two bandpass filters (similar to FIG. 18), one for each of the two pulse frequencies f1,f2, and all the f1 filter outputs fed to a corresponding multiple-channel synchronous detector having f1 as the reference frequency, and all the f2 filter outputs fed to a corresponding multiple-channel synchronous detector having f2 as the reference frequency. The resultant output signals from the synchronous detectors would be fed to the signal processor 52 and evaluated for multiple microphones and multiple wavelengths as discussed hereinbefore.

Figure 8:
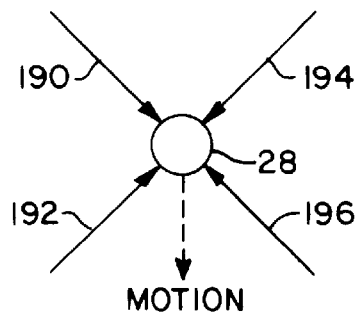
FIG. 8 is a top view of the tube joint of FIG. 5 showing four beams incident on the joint, in accordance with the present invention.

Referring to FIG. 8, more than two beams may be used if desired for any of the embodiments and variations described herein. For example, in FIG. 8, four beams 190–196, each having equal power, are incident on the joint 28.

Referring to FIGS. 6 and 8, the two or more beams incident on the joint 28 need not be positioned symmetrically with respect to the direction of motion of the joint 28. For example, in FIG. 6, the direction of motion may be along a dashed line 197, around which the beams 24,26 are symmetric, or along a line 199, around which the beams 24,26 are asymmetric.

Figure 9A:
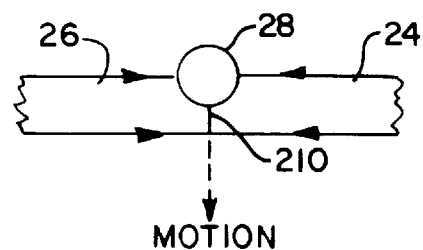
FIG. 9, illustrations (a)–(c), are top views of a joint showing the overlap of beams incident on the joint as the joint passes through the beams, in accordance with the present invention.
Figure 9B:
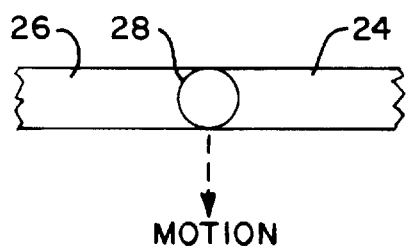
Figure 9C:
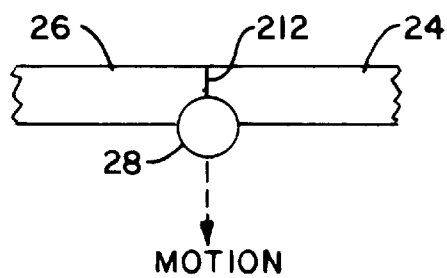

Referring to FIG. 9, illustrations (a)–(c), if the beams 24,26 incident on the joint 28 overlap each other at any location (or region) on the joint 28 during the joint interrogation process, the light intensity at the overlap location(s) would be greater than the intensity seen at other illuminated locations along the joint 28 where overlap did not occur. Acoustic signals measured from these overlap regions would exhibit a higher amplitude signal than at other non-overlap locations, which, if not compensated for, may distort the acoustic measurement. Even with a two beam approach there may be some points (or regions) 210,212 around the joint 28 where the beams 24,26 overlap. The amount of overlap which exists will depend on the diameter of the beams, the number of beams, and the top and side angles of incidence of the beams.

If beam overlap is significant enough to distort the acoustic measurement, numerous possible solutions may be employed. One solution is for the signal processor 52 to reduce the magnitude of the sensor signal corresponding to the locations where the overlaps occur, provided the locations of overlap are predictable and repeatable within certain predetermined tolerances.

Figure 10:
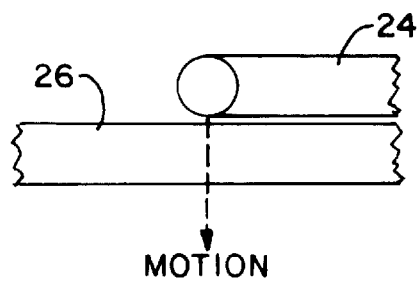
FIG. 10 is a top view of the tube joint of FIG. 5 showing two beams which are offset from each other, in accordance with the present invention.
Figure 11:
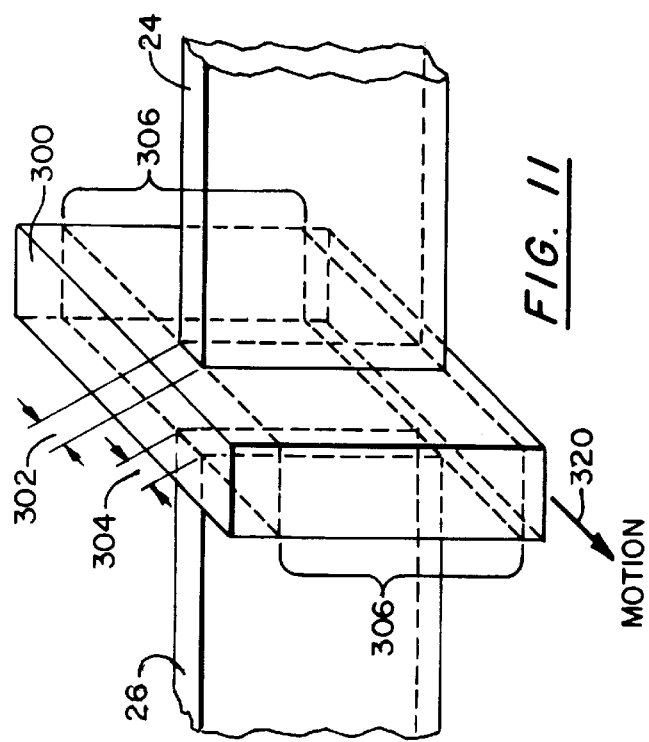
FIG. 11 is a perspective view of a component with two long narrow beams incident thereon, in accordance with the present invention.

Referring to FIG. 10, another way to avoid beam overlap is to horizontally offset the beams 24,26 such that they do not overlap at the joint 28. By offsetting the beams 24,26 horizontally, the vertical inspection region remains unchanged. Also, the horizontal offset placement of the beams 24,26 is not related to the direction of motion of the component 30, i.e., the beam 24 may be located in front of the beam 26 as opposed to in back thereof as shown in FIG. 10. Alternatively, the beams 24,26 may be offset vertically or in other directions if desired.

Still another way to avoid the beam overlap problem is to partially or completely eliminate beam overlap from occurring by phase shifting the timing of the pulses of the beams incident on the joint 28 such that the beams are not illuminating the joint simultaneously. This could be accomplished by optically delaying the path of each of the beams relative to the other beams. Alternatively, separate lasers may be used to provide the two phase shifted beams. In that case, if synchronous detection is used to filter noise (as discussed hereinbefore), there may need to be separate synchronous detectors with a separate reference signal to accommodate for the frequency doubling effect of having twice the number of pulses over the same time period. This applies to any number of beams incident on the joint 28.

Another way to reduce beam overlap effects is to use different pulse frequencies for the beams incident on the component (as discussed hereinbefore). In that case, the time between when the pulses overlap will be set by how close together the pulse frequencies are. Yet another way to reduce beam overlap effects is to use different absorption wavelengths for the beams incident on the component (as discussed hereinbefore). In that case, having different wavelengths reduces the amount of increased intensity seen at the overlap regions.

Referring to FIGS. 1 and 7, due to the possible symmetry of the beams incident on the joint 28 and the possibility of beam overlap, it may be necessary to add functions to prevent the laser beams 24,26 from reentering the laser 10. This can be accomplished by putting an optional optical isolator 220 in the path of the output laser beam 12 (FIGS. 1,7). The isolator 220 comprises known optical components, such as a polarizer followed by a quarter wave plate, or a polarizer followed by a true polarization rotator. The polarizer/wave-plate provides circularly polarized light to the beam splitter 22 and the polarizer/rotator provides linearly polarized light. Other optical isolators or optical techniques may be used to prevent beam feedback into the laser 10. A similar technique can be used with more than two beams.

Referring to FIG. 10, to avoid feedback onto opposite optics, the beams 24,26 may be offset horizontally, or in other directions, as discussed hereinbefore.

Referring to FIGS. 5 and 6, alternatively, to avoid beam feedback onto opposite optics, the top view angle $\theta_3$ between the beams 24,26 (FIG. 6) of the beams 24,26 can be adjusted slightly from 180 degrees (e.g., 0.5 degrees) and/or the side view angles of incidence $\theta_1,\theta_2$ (FIG. 5) of the beams 24,26 can be adjusted slightly from 90 degrees (e.g., 0.5 degrees), to minimize the amount of cross beam coupling on to the other (opposite) beam optics. A similar approach may be used when more than two beams are incident on the joint 28 by similarly adjusting opposing beams. Other techniques may be used to avoid beam feedback onto opposite mirrors.

The beam forming optics 19 and/or the optical isolator 220 may be within the laser source 10 if desired. Also, placement of the optics 19 and the isolator 220 may be reversed. Also, instead of the beams 24,26 propagating in space, they may propagate in a waveguide, such as an optical fiber or a solid state waveguide. Also, more than one laser source may be used to generate the beams 24,26 if desired. Further, the beams 24,26 may be at different wavelengths both of which are absorbed by the leaking gas or the beams may contain more than one wavelength.

Even though the invention has been described as detecting leaks at joints in a component for illustrative purposes, it should be understood that the invention can inspect any point or region on a component or the entire component for gas leaks indicative of various structural flaws such as porosity, cracks, etc.

Referring to FIGS. 11–15, the cross-sectional shape of the beams 24,26 may be any shape and/or dimension that provides complete illumination of a * desired inspection region around a component 300 (or portion thereof) under test. Such complete illumination may occur on a single pass of the component through the beams. For example, in FIG. 11, the beams 24,26 are incident on opposite sides of the component 300 and have a long narrow rectangular cross-section (i.e., "sheet" beams) which expose narrow sections 302,304, respectively, of the component 300 at any given instant in time during exposure, and illuminate an inspection region 306 around the entire component 300 on a single pass through the beams 24,26. Using such a narrow beam shape allows the location of the leak to be isolated to certain sections of the component 300.

Figure 13:
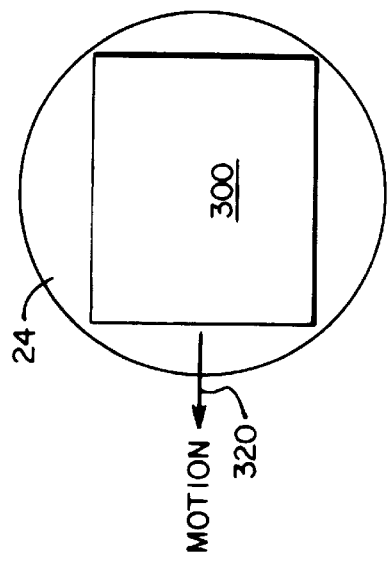
FIG. 13 is a right side view of a component showing beams with a circular cross-section having a diameter larger than side dimensions of the component, in accordance with the present invention.
Figure 12:
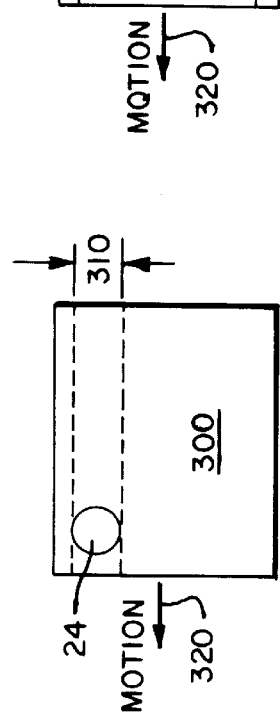
FIG. 12 is a right side view of a component showing beams with a circular cross-section having a diameter smaller than the side dimensions of the component, in accordance with the present invention.

Referring to FIGS. 12–15, a right side view of the component 300 with various beam shapes and sizes incident thereon is shown, showing only the beam 24 cross-section (the beam 26 would be on the opposite side of the component 300). In FIG. 12, the beam 24 has a circular cross-section with a diameter smaller than the side dimensions of the component 300. In that case, complete illumination of an inspection region 310 around the entire component 300 is provided on a single pass through the beams 24,26. In FIG. 13, the beam 24 has a circular cross-section with a diameter greater than the side dimensions of the component. In that case, the entire component 300 is completely illuminated by the beams 24,26 providing an inspection region of the entire component. Such an illumination pattern may be used for leak detection where leak location isolation is not required, e.g., for a casting which would be scrapped if a leak is found.

Figure 15:
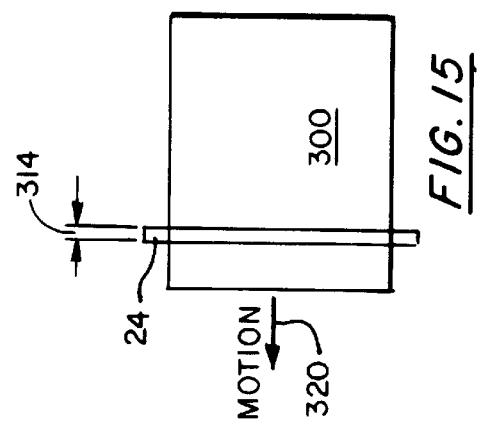
FIG. 15 is a right side view of a component showing beams with a rectangular cross-section larger than one side dimension of the component, in accordance with the present invention.
Figure 14:
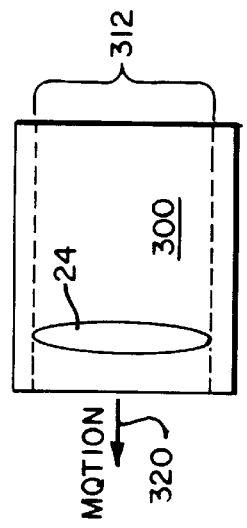
FIG. 14 is a right side view of a component showing beams with an elliptical cross-section smaller than the side dimensions of the component, in accordance with the present invention.

In FIG. 14, the beam 24 has a narrow elliptical (or oval) shape with a length shorter than the vertical side dimension of the component, which completely illuminates an inspection region 312 around the entire component 300 on a single pass through the beams 24,26. In FIG. 15, the beam 24 has a narrow rectangular shape similar to FIG. 10, but which extends beyond the vertical side dimension of the component 300. In that case, a narrow strip 314 of the component 300 is illuminated at any instant in time during exposure, which provides complete illumination of the entire component on a single pass through the beams 24,26, thereby providing an inspection region of the entire component. Other beam shapes and sizes may be used if desired. The size and shape of beams used will determine the amount of location isolation of the leak the system will provide. Also, other component sizes and shapes may be used with the present invention. The direction of motion of the component 300 is indicated by an arrow 320 in FIGS. 11–15.

Figure 16:
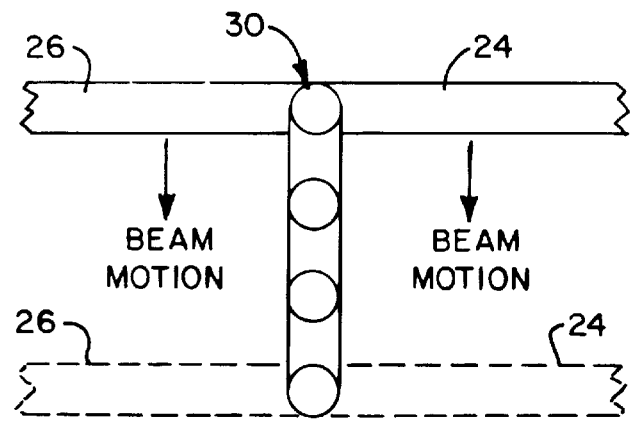
FIG. 16 is a top view of a component showing two beams scanned across the component, in accordance with the present invention.
Figure 17:
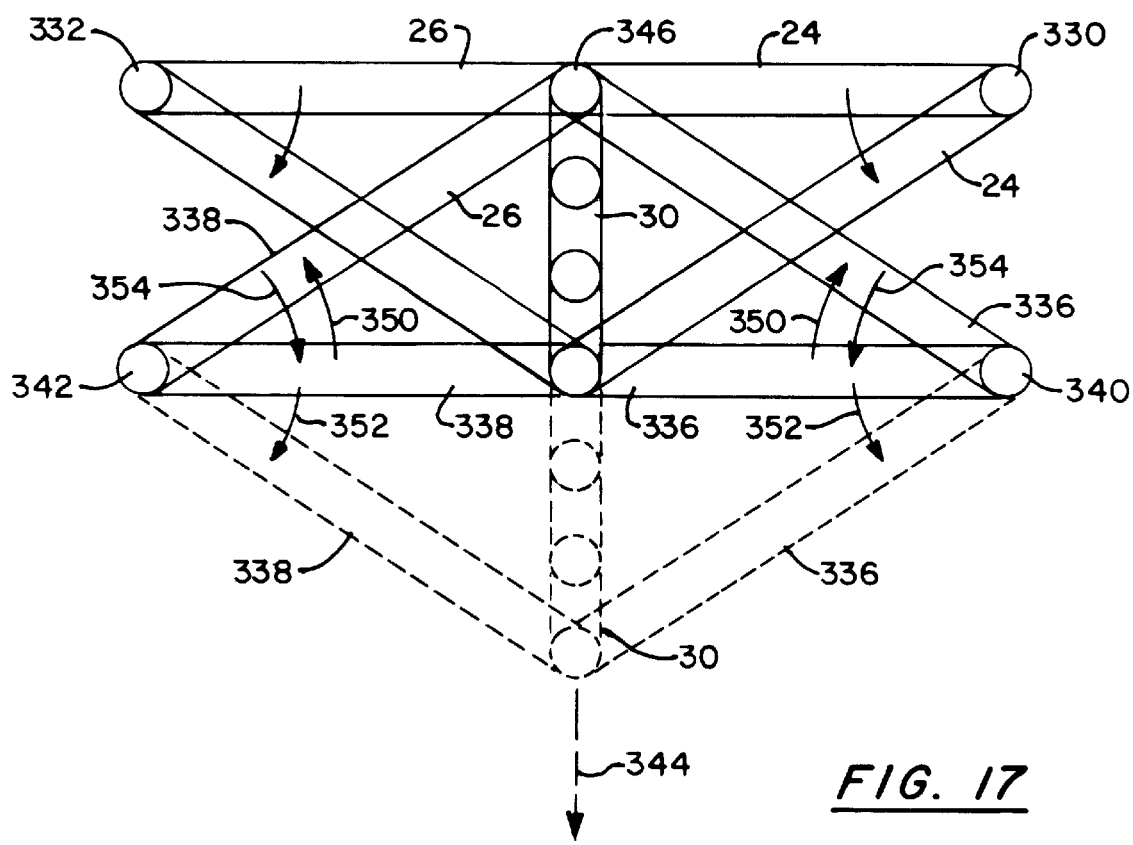
FIG. 17 is a top view of a component showing two and four beams scanned across the component, in accordance with the present invention.

Referring to FIGS. 16,17, instead of the beams 24,26 being stationary and moving the component 30 (e.g., the single row coil described in FIG. 2) under test through the beams 24,26, the beams 24,26 may be scanned or moved across the component 30 such that the beams 24,26 provide complete illumination of the desired inspection region around the component (or portion thereof) under test. Alternatively, both the component 30 may be moved through the beams 24,26 and the beams 24,26 scanned across the component 30, at the same time or sequentially. Such movement or scanning of the beams 24,26 may be used with any of the embodiments discussed herein. In that regard, the motion arrows 320 in FIGS. 11–15 may indicate the motion of the beams 24,26 or the component 300.

Referring to FIG. 16, the beams 24,26 may move across the component 30 without pivoting. Referring to FIG. 17, alternatively, the beams 24,26 may pivot about stationary or moving pivot points 330,332. More than two beams may be scanned to provide complete illumination of the inspection region around the component (or portion thereof), depending on the scan angles and placement of the beams. For example, additional beams 336,338 which pivot about stationary or moving pivot points 340,342, may be used to provide complete illumination of the component (or portion thereof) if needed. Alternatively, the pivot points 330,332 may be placed in any other locations if desired, such as half way between the two ends of the component 30. Also, the pivot points 330,332 need not be located symmetrically on opposite sides of the component 30.

Alternatively, more than one scan of the beams across the component 30, in combination with moving the component 30, may be performed to provide complete illumination of the component (or portions thereof). For example, in FIG. 17, if only the two beams 336,338 are used and the component 30 is in the upper (solid outline) position shown in FIG. 17, the component 30 is first scanned by the beams 336,338 in the direction of arrows 350, and then the beams 336,338 are brought back to their original position (the beams 336,338 need not be on during the return path). Next, the component 30 is moved in the direction of the arrow 344 until the first coil 346 is aligned with the beams 336,338, as indicated by the dashed outline of the component 30. Then, the component 30 is scanned by the beams 336,338 in the direction of arrows 352, to provide complete illumination of the component 30 (or portion thereof). Alternatively, to reduce the number of mechanical scanning operations, the beams 336,338 may begin scanning the component 30 at the top coil 346 and rotate in a direction 354 to where the beams 336,338 are opposite each other. Then, the component 30 is moved along the line 344 and the beams 336,338 scanned across the component in the direction of the arrows 352 to provide complete illumination. Other configurations, component movements, number of beams, and/or scanning techniques may be used which require more than one scan of the beams incident on the component, to provide complete illumination of the component 30 (or portions thereof).

Also, the beams 24,26 may be scanned in-phase with each other across the unit, such that the beams 24,26 are incident on opposite sides at any given location of the component simultaneously. Alternatively, the beams 24,26 may be scanned out of phase with each other (or offset from each other), such as shown in FIG. 10, such that opposite sides of any given location are not scanned at the same time. If the beams are scanned out of phase, this also may be used to eliminate overlap of the beams (discussed hereinbefore). Also, the scan rate of each of the beams 24,26 may be the same or different if desired. To accommodate scanning the beams 24,26, the mirrors 27,34 in FIGS. 1 and 7 may be replaced with scanning mirrors (or a beam scanner) to provide the desired beam scanning function. Other known optical scanning techniques and hardware may be used if desired. In that case, the beam position may be set by a scan signal from the signal processor 52 to the beam scanner (not shown). Alternatively, the beam scanner may independently scan the component under test and provide a beam position signal to the signal processor 52.

Also, if beam scanning is used, to retain a substantially constant acoustic signal strength for a given leak, one or more of the microphones may move with the moving beam across the component, thereby providing a substantially constant acoustic travel distance (and thus signal strength) for the acoustic signals from the exposure region on the component to the microphone(s). Alternatively, if the microphone(s) remains stationary, the signal processor 52 may compensate for the changing acoustic signal strength due to the changing acoustic travel distance between the microphone(s) and the inspection region.

Also, as discussed hereinbefore, the pulse frequency of each of the laser beams 24,26 incident on the component 30 may be different if desired. In that case, if the two pulse frequencies are within the passband of the filter 44 (FIG. 1) and within the detection range of the synchronous detector 18, no additional hardware may be needed to detect the acoustic leak signal. However, if the frequencies are not within the passband and/or if it is desirable to isolate which side of the component a leak exists, a separate bandpass filter and/or synchronous detector may be used to provide such isolation. This is also applicable to more than two beams incident on the component 30.

Also, it should be understood that some or all of the functions shown as the blocks 44,18,52 in FIG. 1, or the blocks 88,94,18,100,52 in FIG. 7, or the blocks 44,270,18, 264,52 in FIG. 18, may be implemented within the signal processor 52, as indicated by a dashed block 400, and may also be implemented by a programmed digital computer with the appropriate input/output interfaces, analog-to-digital or digital-to-analog converters, and memory sufficient to perform the functions described herein.

Further, terms relating to orientation, such as: top, bottom, vertical, horizontal, side, and the like, are relative terms and are used herein for illustrative purposes. It should be understood that such terms depend on factors such as the orientation of the viewer, the leak detection system, and the component under test, and appropriate alternative terms may be substituted therefor in the event such orientations are different from the way they are presented herein, for a given application.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. A photo-acoustic leak detection system, comprising:
   a beam incident on a component containing a gas, said beam having a first wavelength which is absorbed by said gas and a second wavelength which is not absorbed by said gas, said gas emitting a first acoustic signal upon absorbing said first wavelength, said second wavelength producing a second acoustic signal;

an acoustic sensor which receives said first and second acoustic signals, said acoustic sensor providing a first sensor signal and a second sensor signal indicative of said first and second acoustic signals, respectively; and a signal processor which receives said first and second sensor signals, said signal processor providing an output signal indicative of the existence of a leak in said component, said signal processor using said second sensor signal as a non-leak baseline measurement.

2. The photo-acoustic leak detection system of claim 1 wherein said beam is pulsed at a pulse frequency which is related to a detection frequency of said first and second acoustic signals.

3. The photo-acoustic leak detection system of claim 2, wherein said detection frequency is substantially the same as said pulse frequency.

4. The photo-acoustic leak detection system of claim 2 wherein said signal processor comprises filter means for passing energy at said detection frequency and not passing energy outside said detection frequency.

5. The photo-acoustic leak detection system of claim 2 wherein said signal processor comprises a filter having a passband frequency range which includes said detection frequency.

6. The photo-acoustic leak detection system of claim 2, wherein said pulse frequency is at a frequency at which the magnitude of background acoustic noise at said detection frequency is at a predetermined low level.

7. The photo-acoustic leak detection system of claim 6 wherein said predetermined low level is smaller than a predetermined minimum magnitude of said acoustic signal by a predetermined ratio.

8. The photo-acoustic leak detection system of claim 7 wherein said predetermined ratio is at least three-to-one.

9. The photo-acoustic leak detection system of claim 2, wherein said pulse frequency of said beam is at least: 10 KHz, 20 KHz, 30 KHz, 40 KHz, 50 KHz, 60 KHz, 70 KHz, 80 KHz, 90 KHz, or 100 KHz.

10. The photo-acoustic leak detection system of claim 1 further comprising optical means for providing said beam.

11. The photo-acoustic leak detection system of claim 10 wherein said optical means comprises reference means for providing a reference signal to said signal processor indicative of said beam.

12. The photo-acoustic leak detection system of claim 11, wherein said signal processor comprises at least one filter responsive to said at least one acoustic sensor which provides a filtered signal.

13. The photo-acoustic leak detection system of claim 12, wherein said signal processor comprises at least one synchronous detector responsive to said filtered signal and to said reference signal.

14. The photo-acoustic leak detection system of claim 10 wherein said optical means comprises an optical isolator to prevent said beam from reentering said optical means.

15. The photo-acoustic leak detection system of claim 1, wherein said beam is stationary.

16. The photo-acoustic leak detection system of claim 1, wherein said beam moves across at least a portion of said component.

17. The photo-acoustic leak detection system of claim 1, wherein said output signal is indicative of the amount of the gas leak on the component.

18. The photo-acoustic leak detection system of claim 1, wherein said output signal is indicative of whether or not a leak exists.

19. The photo-acoustic leak detection system of claim 1, further comprising multiple acoustic sensors.

20. The photo-acoustic leak detection system of claim 1, wherein said acoustic sensor comprises a microphone.

21. The photo-acoustic leak detection system of claim 1, wherein said acoustic sensor comprises an acoustic reflector.

22. The photo-acoustic leak detection system of claim 1, wherein said component comprises a heat exchanger coil.

23. The photo-acoustic leak detection system of claim 1, wherein said first wavelength is pulsed at a first pulse frequency and said second wavelength is pulsed at a second pulse frequency.

24. The photo-acoustic leak detection system of claim 23, wherein said first pulse frequency is substantially the same as said second pulse frequency.

25. The photo-acoustic leak detection system of claim 23, wherein said first pulse frequency is phase shifted with respect to said second pulse frequency.

26. The photo-acoustic leak detection system of claim 1 further comprising a multiple beams incident on said component, said multiple beams having said first wavelength and said second wavelength.

27. The photo-acoustic leak detection system of claim 26, wherein said multiple beams are incident on opposite sides of the component.

28. The photo-acoustic leak detection system of claim 26, wherein said multiple beams comprise two beams having a top view angle between said beams of approximately 180 degrees.

29. The photo-acoustic leak detection system of claim 26, wherein said multiple beams comprise two beams having side view angles of incidence of approximately 90 degrees from the vertical.

30. The photo-acoustic leak detection system of claim 26, wherein said multiple beams are offset from each other.

31. The photo-acoustic leak detection system of claim 1, wherein said output signal is indicative of the location of the leak in the component.

32. A photo-acoustic leak detection system for detecting a gas leaking from a component, comprising:

at least two laser beams, incident on the component so as to completely illuminate an inspection region around at least a portion of the component, each beam having a corresponding wavelength which is absorbed by the gas and a corresponding wavelength which is not absorbed by the gas, the gas emitting an acoustic signal when the gas absorbs light from at least one of the beams;

at least one acoustic sensor, which receives said acoustic signal and provides a sensor signal indicative of said acoustic signal; and a signal processor, which receives said sensor signal and provides an output signal indicative of the leak in the component, wherein said signal processor measures said acoustic signal associated with said non-absorbed wavelength as a non-leak baseline measurement for the component.

33. The photo-acoustic leak detection system of claim 32, wherein said at least two beams do not overlap each other on any portion of said inspection region.

34. The photo-acoustic leak detection system of claim 32, wherein the portion of the component comprises at least one joint on the component.

35. The photo-acoustic leak detection system of claim 32, wherein said complete illumination of the inspection region occurs on a single exposure of the component by said beams.

36. A method for detecting a gas leaking from a component, comprising the steps of:

directing a beam, having a first wavelength which is absorbed by the gas and a second wavelength which is not absorbed by the gas, at a component;

measuring a first acoustic signal when the gas absorbs said first wavelength;

measuring a second acoustic signal when the second wavelength contacts the component; and transmitting said first and second acoustic signals to a signal processor which uses said second acoustic signal as a non-leak baseline measurement and produces an output signal indicative of the existence of a leak in the component.

37. The method of claim 36, further comprising the step of pulsing said beam at a corresponding pulse frequency.

38. The method of claim 37, wherein said pulse frequency of each of said beams is at least: 10 KHz, 20 KHz, 30 KHz, 40 KHz, 50 KHz, 60 KHz, 70 KHz, 80 KHz, 90 KHz, or 100 KHz.

39. The method of claim 36, further comprising the step of pulsing said first and second wavelengths at a corresponding pulse frequency.

40. The method of claim 39, wherein said pulse frequency of said first and second wavelengths is the same frequency.

41. The method of claim 39, wherein said pulse frequency of said second wavelength is phase-shifted in time with respect to said pulse frequency of said first wavelength.

42. The method of claim 36 further comprising directing multiple beams, each having said first wavelength and said second wavelength, at said component.

43. The method of claim 42, wherein said multiple beams are incident on opposite sides of the component.

44. The method of claim 42, wherein said multiple beams comprises two beams having a top view angle between said beams of approximately 180 degrees.

45. The method of claim 42, wherein said multiple beams comprises two beams having side view angles of incidence of approximately 90 degrees from the vertical.

46. The method of claim 42, wherein said beams are offset from each other.

47. The photo-acoustic leak detection system of claim 42, wherein said beams do not overlap each other on any portion of said inspection region.

48. The method of claim 36 further comprising directing at least two beams at the component so as to completely illuminate an inspection region around at least a portion of the component, each beam having said first wavelength and said second wavelength.

49. The method of claim 48, wherein said complete illumination of the inspection region occurs on a single exposure of the component by said beams.

50. The method of claim 48, wherein said complete illumination of the inspection region occurs on a single exposure of the component by said beams.

51. The method of claim 36, wherein said beam is stationary.

52. The method of claim 36, wherein said beam moves across at least a portion of said component.

* * * * *